(12) United States Patent
Scheifele

(10) Patent No.: US 7,757,884 B2
(45) Date of Patent: Jul. 20, 2010

(54) PACKAGING CONTAINER

(75) Inventor: Fredy Scheifele, Frauenfeld (CH)

(73) Assignees: KMK Lizence Ltd., Port Louis (MU); PackSys Global (Switzerland) Ltd., Zurich (CH)

( * ) Notice: Subject to any disclaimer, the term of this patent is extended or adjusted under 35 U.S.C. 154(b) by 1932 days.

(21) Appl. No.: 10/486,064

(22) PCT Filed: Aug. 7, 2002

(86) PCT No.: PCT/CH02/00432

§ 371 (c)(1),
(2), (4) Date: Sep. 20, 2004

(87) PCT Pub. No.: WO03/013965

PCT Pub. Date: Feb. 20, 2003

(65) Prior Publication Data

US 2005/0029216 A1    Feb. 10, 2005

(30) Foreign Application Priority Data

Aug. 7, 2001    (DE) ................................ 101 37 937

(51) Int. Cl.
*B65D 6/28* (2006.01)
*B65D 8/04* (2006.01)
*B65D 8/06* (2006.01)

(52) U.S. Cl. ...................... 220/610; 215/12.1
(58) Field of Classification Search ................ 220/610, 220/626; 215/12.1
See application file for complete search history.

(56) References Cited

U.S. PATENT DOCUMENTS

| | | | | |
|---|---|---|---|---|
| 4,011,968 A | * | 3/1977 | McGhie et al. | 222/107 |
| 4,185,757 A | * | 1/1980 | Schultz | 222/107 |
| 4,492,548 A | * | 1/1985 | Hubert | 425/113 |
| 5,656,346 A | * | 8/1997 | Hirt | 428/36.91 |

* cited by examiner

*Primary Examiner*—Anthony Stashick
*Assistant Examiner*—Harry A Grosso
(74) *Attorney, Agent, or Firm*—Bachman & LaPointe, P.C.

(57) ABSTRACT

A packaging container such as a tube, which is characterized in that the head (11) of the tube is inter alia sealed by the interior annular element (18) configured by a film material that engages with the shoulder (15) of the head. The annular element (18) is produced by pre-forming a plastic film annular element (18).

5 Claims, 3 Drawing Sheets

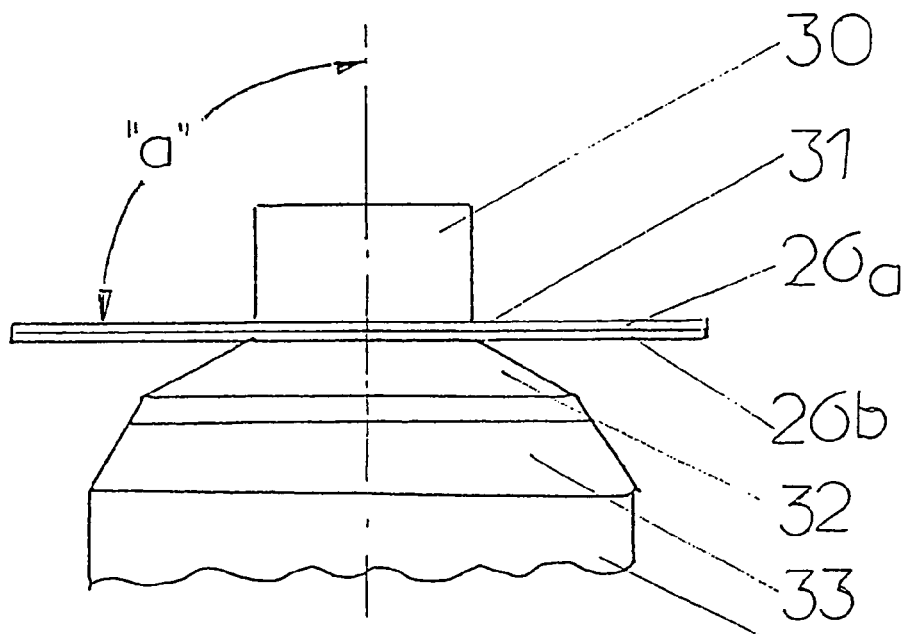
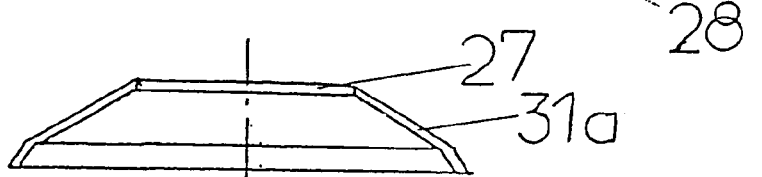
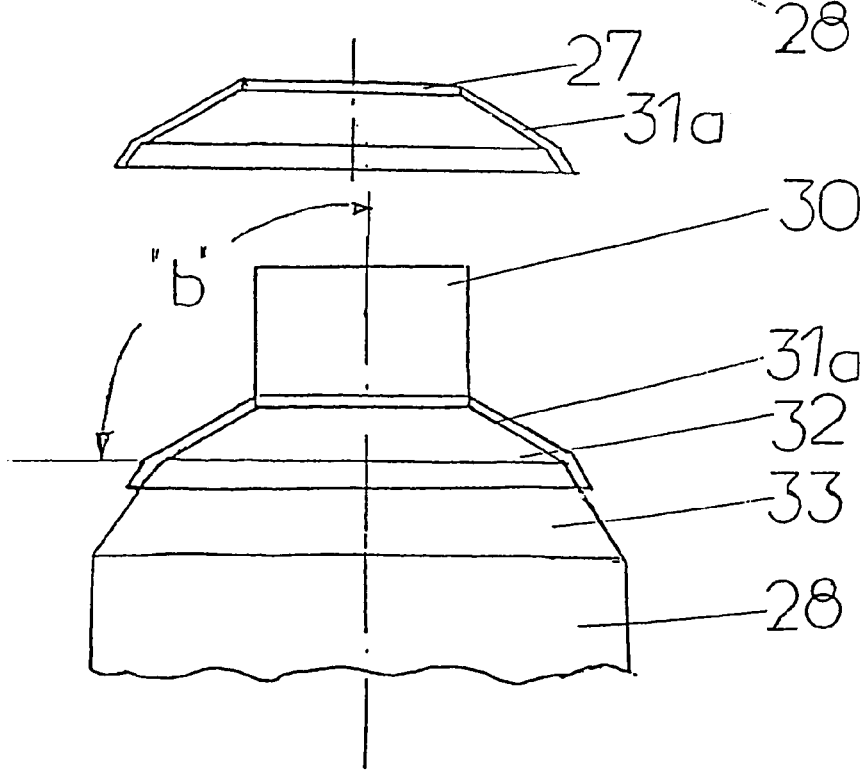

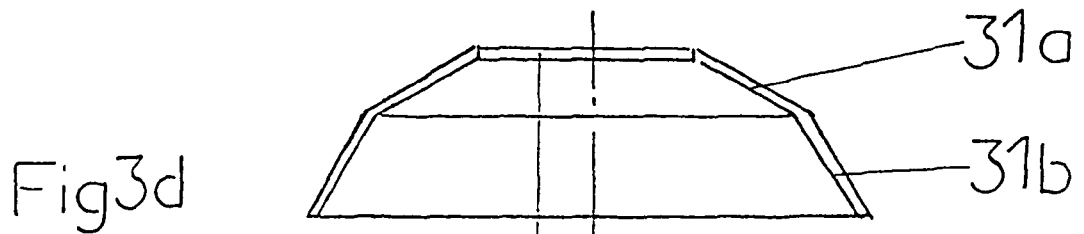
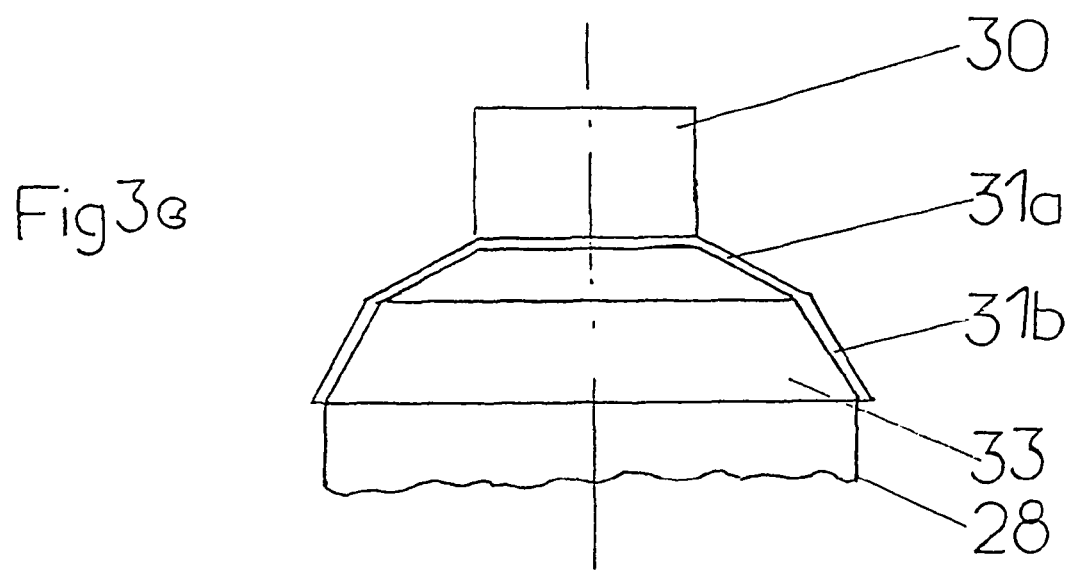
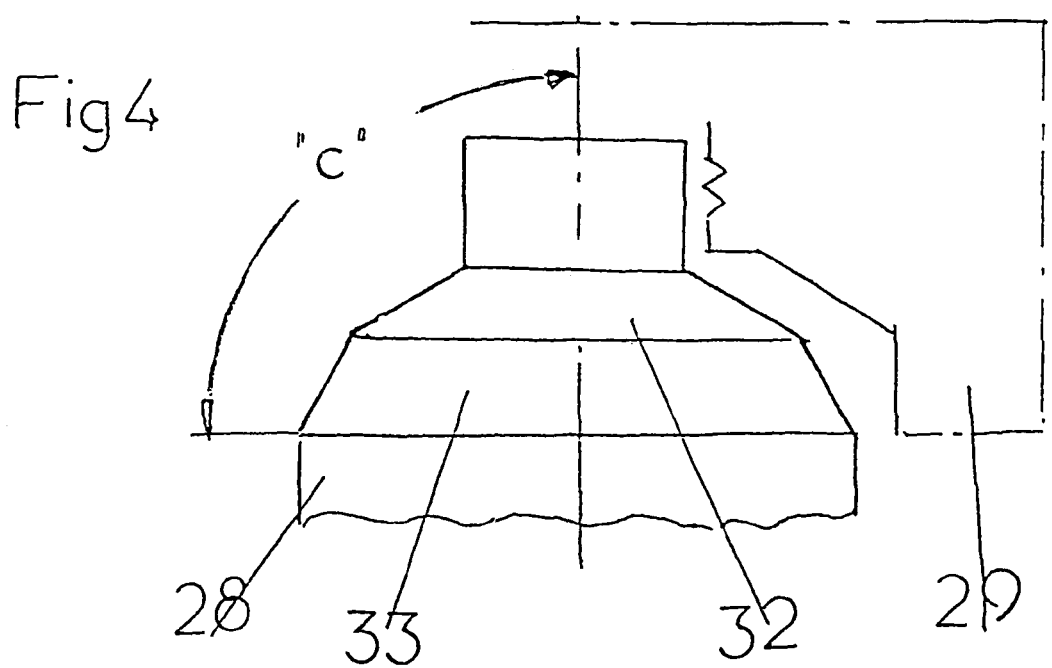

PACKAGING CONTAINER

BACKGROUND OF THE INVENTION

The present invention relates to a packaging container, particularly, a packaging tube.

Packaging containers, especially packaging tubes, comprise a tubular body, sometimes also referred to as pipe body, a tube head connected with the tubular body and provided with a discharge (dispenser), and a closure cap that opens and closes the discharge and is attached to the tube head, for instance, by means of a screw thread. Various methods have been developed for the production of packaging containers of the type briefly outlined hereinabove. For example, the tubular bodies may be extruded or co-extruded or, starting from a strip of sheeting, they may be produced by so-called longitudinal seam welding in which the edges of the sheeting strip are joined to each other by the application of heat and pressure and thus form the tubular body. As regards the materials for the tube body, use is made of metals, plastic materials with or without barrier layers and combinations of these materials, the actual choice of material being for the most part governed by the merchandise for which the packaging tube is intended. High-quality goods, such as pharmaceuticals, cosmetics and other body-care means—toothpaste being a case in point—that contain volatile active ingredients or react with gases, call for tubular bodies made of diffusion-resisting materials or material combinations, whereas in the case of less demanding merchandise, such as technical lubricants for example, materials without blockage effect will prove sufficient. The term diffusion is here understood as referring to the migration of volatile components from the interior of the tube towards the outside and vice versa. Once the tube bodies have been produced, they are equipped with heads. This operation can be performed by means of press moulding or injection moulding or by the application of a prefabricated head to the tube body. The plastic materials used for the heads and the tubes have to be compatible, because in each of the named methods the plastic materials of the head and the tube have to flow into each other in order to form the joint. When press moulding is employed, a blank of plasticized plastic material is transformed in a press mould and, while this process is going on, one end of the tube body is also joined to the head that is coming into being. Joining by injection moulding is characterized by the fact that one end of the tube body is joined to the head during the mould-filling process. When a prefabricated head is joined to a tube body, the tube body is attached to the shoulder of a head by means of melting and pressure.

In the case of packaging tubes for high-quality substances, where the tube body is rendered substantially diffusion-resistant by means of an appropriate choice of material, problems are created by the fact that the diffusion resistance of the head has to be made to match that of the tube body. When the previously named head forming and jointing methods are employed, polyolefins, preferably polyethylene (PE) and polypropylene (PP), are used as materials. When this material is used for the head and the tube consists of a laminate, the material of at least one laminate layer, i.e. of one of the cover layers, must be compatible, so that a head-tube joint can be obtained by means of melting and the application of pressure. The aforementioned polyolefins have the advantage that they can be readily jointed, but the drawback that they absorb the volatile components of the packed substances, aromatics among them, with the consequence that the packed substances suffer a quality reduction, and it can also happen that the head disintegrates, as it were, on account of the material consistency becoming soft, i.e. spongy. Gradual disintegration of the material consistency facilitates increased absorption of volatile components and endangers the strength of the joint between head and tube body.

Seals have been developed against this insufficient diffusion resistance. A distinction is made between external seals and internal seals, the former being applied to the external surface of the tube shoulder, the latter to the internal surface of the tube shoulder facing the interior of the tube, covering the shoulder surfaces from the dispenser neck to the joint between tube and head. Seals in the form of annular disks, with a central hole as aperture for the outlet channel, are described as external and internal annular elements according to the place where they are applied. As far as the sealing of tube heads is concerned, external annular elements have not attained the same importance as their internal counterparts. This is due to the fact that, subject to their being made of appropriate materials, they will render the passage of gases ($O_2$, $CO_2$, etc.) from the outside inwards more difficult or even suppress it altogether, but are not effective against the absorption of gaseous components of the packed substances (aromatics, for instance), whereas internal annular elements will perform both these sealing functions, always provided that the internal annular element covers the internal surface of the tube shoulder without jointing defects. A jointing defect is here understood as a folding or waving of the annular element, so that its open sides will not be joined to the surface of the tube shoulder. Jointing defects often lead to fractures of the seals, i.e. the annular elements, in which case there will be no blockage effect at all.

As material for the annular elements, which are produced from film strips, consideration may be given to monofilms (monofilms of plastics or metals), plastic-plastic laminates and plastic-metal laminates. To all intents and purposes, however, only plastic-metal laminates have proved successful among these films, and this for the reason that only annular elements made of this material combination can be joined to the shoulder of a head without jointing defects, while in the case of annular elements made of plastic films, inclusive of plastic laminate films, lack of jointing defects cannot be attained with certainty.

Plastic-metal laminates consist of an aluminium film that is sheathed, i.e. covered on both sides with a polyolefin film. In most cases so-called adhesion promoters are also to be found between the aluminium layer and the polyolefin layers. The aluminium layer or aluminium film serves as barrier layer, and constitutes a highly effective barrier layer against migrations any kind, whereas one polyolefin layer serves as means for joining the annular element to the shoulder surface, the other polyolefin layer as separation of the aluminium layer from the packed material. Though they have the advantages of the defect-free mounting on the head and considerable diffusion resistance, annular elements made of plastic-metal laminates are also associated with disadvantages. The elements are cut or, more precisely, punched from a strip of material. At the cutting or punching edge the metal will be bared and remain uncovered. In the built-in position of the annular element, given a difference between the outer diameter of the element and the inner diameter of the tube body, this metallic part of annular element will not be protected against the packed substance and, depending on the type of substance involved, the metal may lead to contamination of the packed material or the packed material can cause corrosion of the metal layer starting from the metallic cutting edge. Further, films of the type described above are prone to become delaminated between the two covering layers and the intermediate metal layer, starting from the cutting edge. Annular elements made of plastic material do not have the drawbacks of contamination and delamination, but their marked tendency to become folded and wavy constitutes an equivalent disadvantage.

Bearing in mind this prior art, the inventor set himself the object of developing an annular element (i.e. an internal annular element) with which the disadvantages of the known annular elements will be avoided.

SUMMARY OF THE INVENTION

The foregoing object is achieved by the present invention by providing a packaging tube comprising a tubular tube body and a tube head arranged on the tube body, said tube head consisting of a shoulder and a discharge and an internal annular element that is arranged on the side of the shoulder facing the interior of the tube body and covers said side, characterized in that the internal annular element (18) is made to engage pre-formed with the shoulder. The advantages of the annular element in accordance with the invention also comprise that fact that it can be used with all the methods for attaching the head and does not call for any constructional modification of the moulds used for attaching the head.

BRIEF DESCRIPTION OF THE DRAWINGS

Further advantages, characteristics and details of the invention are brought out by the following detailed description of a preferred embodiment and the drawing, of which:

FIG. 3a shows a section through a mandrel with an applied and not pre-formed annular element;

FIG. 3b shows a section through a pre-formed annular element intended to cover only the shoulder part of the tube head;

FIG. 3c shows a section through a mandrel with an applied annular element in accordance with FIG. 3b;

FIG. 3d shows a section through a pre-formed annular element that covers the shoulder part of the tube head and the forward end of the tube;

FIG. 3e shows a section through a mandrel with an applied annular element in accordance with FIG. 3d;

FIG. 4 shows a schematic representation of a forming tool comprising mandrel and female mould

DETAILED DESCRIPTION

Figure 1:
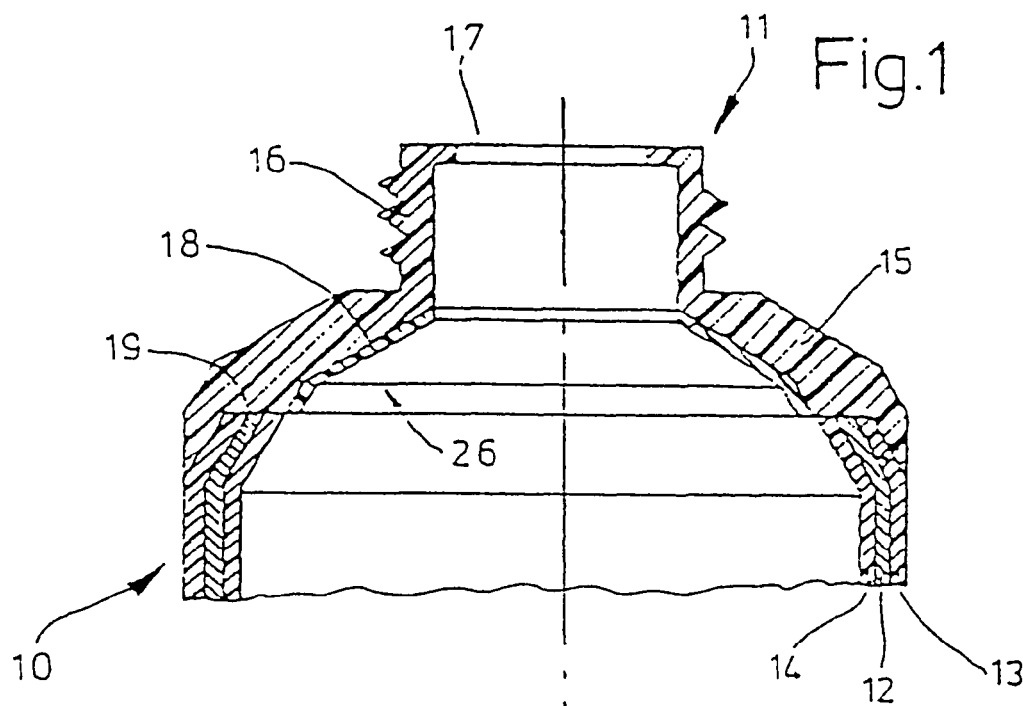
FIG. 1 shows an axial section through a first embodiment of the end of a tube with a dish-like disk (internal annular element) in the shoulder part of a tube head.
Figure 2:
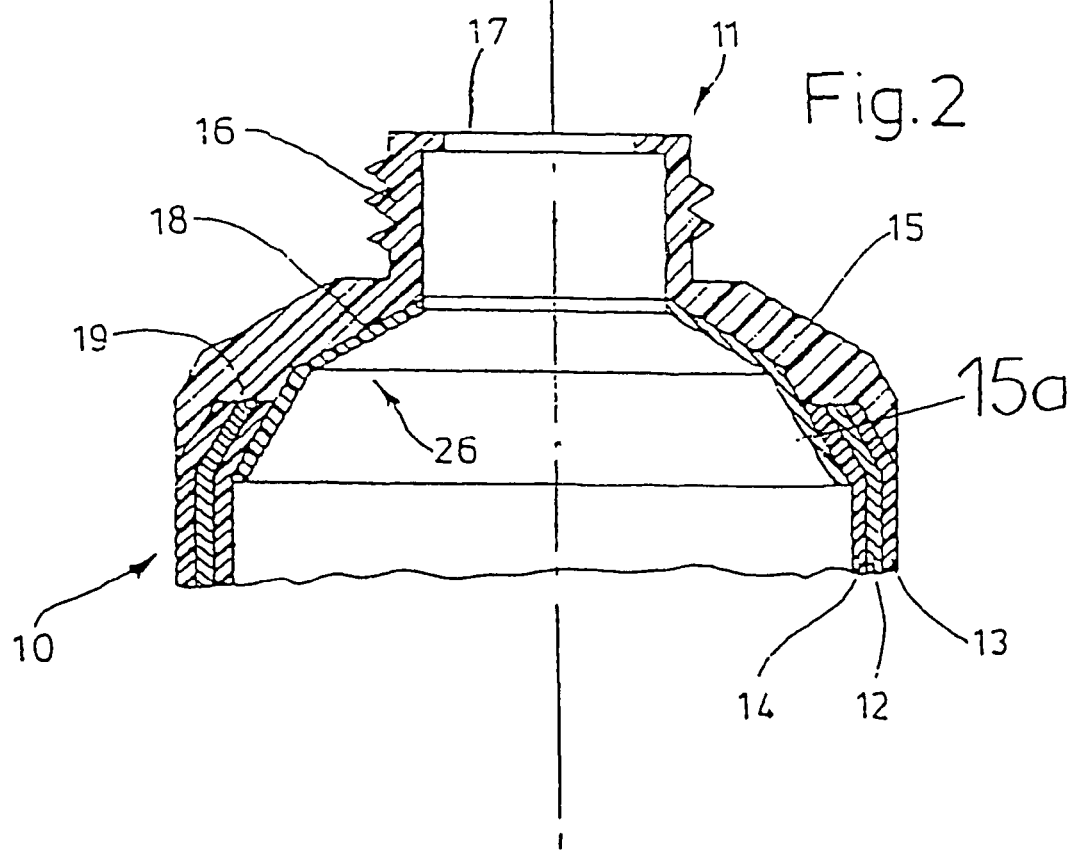
FIG. 2 shows a further embodiment in accordance with FIG. 1 in which the internal annular element overlaps the forward end of the tube.

In FIGS. 1 and 2 (identical parts are indicated by the same reference numbers in all figures) the reference number 10 designates tube bodies that, though only their head-sided terminal parts are actually shown, in each case, together with the heads generically indicated by 11, constitute a packaging tube.

The tube body is made, for example, from a three-layered laminate. This laminate consists of a middle layer performing a blocking action, the blockage layer 12, made of EVAL (ethylene-vinyl alcohol copolymer) or PETP (polyethylene terephthalate) covered on both sides by layers 13 and 14 made of PE (polyethylene), where the PE may be an LDPE (low density polyethylene), an HDPE (high density polyethylene) or a mixture of these. The layer 12 may be connected to the layers 13, 14 by means of intermediate layers (not shown) of copolymers. A blockage layer made of metal, preferably aluminium, may be used in place of the plastic blockage layer. For the production of tube bodies 10 it is advantageous to provide layers 13 and 14 made of polyethylene, because the good weldability of this material assures that the welded seems will be good and tight.

The head 11, also known as headpiece, consists of a shoulder part 15 and a discharge (or neck) 16 with a discharge opening 17, the outer surface of the discharge 17 being provided with engagement means for a tube closure, a thread for example. The head made of plastic material, preferably polyethylene, may be either pre-formed or formed in situ by means of injection moulding. Using the same material, the head 11 may also be formed by press-moulding a plasticized portion of material, i.e. a blank. Irrespective of whether injection or press moulding is used, the joining of the tube body 10 and the formation of the head 11 are mostly combined into a single working step by inserting the ends of the ends of the tube bodies 10 in the inject or press moulds and thus joining them to the head during its production process. When a prefabricated head is to be mounted on the end of a tube, this is obtained by melting the plastic material of the head and the tube and pressing them together.

Injection or press moulded polyethylene is more readily permeable for aromatics and fragrances, oxygen and carbon dioxide than a multi-layer plastic film. For this reason, the head 11 has to be sealed in order to give a diffusion resistance comparable to that of the tube body when better-quality materials have to be packed. According to FIGS. 1 and 2, diffusion-blocking devices 26 are therefore provided, in FIG. 1, for example, in the form of a dish-shaped disk 18 (also referred to as internal annular element) that bears against the internal surface of the shoulder part 15 facing the interior of the tube 10 and extends from the end 19 of the tube right up to the entry opening of the discharge 17 and preferably has its entire surface joined to the head 11. FIG. 2 shows an advantageous further development of the embodiment in accordance with FIG. 1. Accordingly, the internal annular element 18 is designed in such a manner that one of its ends covers and overlaps the tube end 19 engaged with the shoulder part 15 and then extends to the entry opening of the discharge 17. This overlap assures better sealing between the internal annular element 18 and the tube end 19.

Given prefabricated tube heads 11, the internal annular element 18 in accordance with FIGS. 1 and 2 can be glued into the tube heads or welded to them.

Preferably in keeping with the size of the tubes and the material with which they are to be filled, plastic monofilms, for example PET or PA (polyamide) or EVAL, will have a thickness between 15μ and 80μ, preferably between 20μ and 40μ. Plastic laminates (i.e. multi-layer films) will preferably have an overall thickness between 60μ and 200μ, preferably between 100μ and 140μ, inclusive of the thickness of a barrier layer, which may be made of PET, EVAL or PA, of between 5μ and 60μ preferably between 10μ and 30μ (μ=0.001 mm).

Multi-component dies consisting of a female mould 29 and a male mould (press mandrel) 28 are used when a head 11 is made by means of injection or press moulding. The head sealing means, i.e. the internal annular elements 18, according to the invention with a PE layer 26a, are prefabricated and placed on the mandrel, so that during the injection or pressing process for the formation of the head 11 the PE layer 26 becomes joined to the shoulder 15 and, in the case of the embodiment in accordance with FIG. 2, also with the tube body 10.

When the internal annular element 18 in accordance with the invention overlaps the tube end 19, the internal PE layer 14 of the tube body 10 will also become joined to the outer layer 26a of the internal annular element 18, and thus assures even better sealing and also a strengthening of the joint between the tube body 10 and the head 11.

The preferred embodiment of the internal annular element 18 described hereinabove is not limited to layer 26, 26a made of polyethylene and EVAL or PETP or PA. For these layers it is also possible to use polypropylene (Layer 26) with EVAL or PETP, PA or other materials suitable for barriers (Layer 26a).

According to the method in accordance with the invention, the internal annular elements 18 are to be pre-formed in order to avoid jointing defects, i.e. folding and/or waving of the internal annular element 18, when it is pressed against or jointed to the internal surface of the shoulder 15. In its simple form as illustrated by FIG. 3a, the internal annular element 18 is a round disk with a central round cut-out 27, which is provided to permit the passage of the part 30 of the mandrel 28 that forms the discharge channel, and a circular fringe part 31 that surrounds the cut-out 27 and lies in a plane that is perpendicular to the centre line of the cut-out 27, i.e. the angle "a" that the plane and the centre line constitute with respect to each other amounts to 90°, i.e. a right angle, when the annular element 18 is still in its non pre-formed condition. Bearing this in mind, ... the term "pre-formed" has the meaning of any deviation of the angular position between said plane and centre line from the original right angle. Hereinbelow the pre-forming will be expressed in parts per hundred, i.e. as a pre-forming degree percentage (%). A pre-forming degree of zero % means that said plane and centre line form a right angle with respect to each other. Expressed in terms of the position of the annular element 18 on the mandrel 28, this means that the circular fringe part (31) of the annular element 18 projects from the discharge-channel-forming part 30 of the mandrel 28, i.e. from its axial centre line, at a right angle. Considering the mandrel 28, an angle "b" is formed between the centre line of the discharge-channel-forming part 30 of the mandrel 28 and the surface of the mandrel that forms the inner surface of the shoulder 15 of the head 11. A pre-forming degree of 100% will be constituted when the angle "a" between the plane 31 and the vertical centre line of the cut-out 27 of the annular element 18 corresponds to the angle "b" (angle of the tube shoulder) between the centre line of the discharge-channel-forming part 30 and the surface 32 of the mandrel 28, i.e. when the pre-formed circular fringe part 31 lies on the surface 32 of the mandrel (28). Preferred in accordance with the invention are pre-forming degrees of between 20% (% of one hundred) and 95%, preferably between 40% and 60%. When the pre-forming degree is less than 20% or exceeds 95%, it is surprisingly no longer possible to be certain that no jointing defects will occur.

According to FIG. 1, the shoulder surface 15 is covered by an annular element 18, whereas in FIG. 2 the annular element covers the shoulder surface 15 and the jointed front end 15a of a tube body 10. FIG. 3b a shows a pre-formed annular element 18 whose fringe part 31 covers the shoulder surface 32 as a single-component fringe part 31a. FIG. 3d shows a pre-formed annular element 15 with a fringe 31 made up of two fringe parts 31a and 31b, with the edge part 31a covering the shoulder surface 32, while the fringe part 31b covers the jointing end 15a.

According to FIGS. 3e and 4, the fringe part 31a corresponds to the mandrel surface 32 (also mandrel surface 32) and the fringe part 31b to the mandrel surface 33, where the mandrel surface 33 makes a larger angle "c" with respect to the centre line of the part 30 than the angle "c". The fringe part 31b may have the same pre-forming degree as the fringe part 31a, in which case the lower limit of the pre-forming degree of 20% should once again not be understepped for the edge part 31b, nor should the upper limit of 95% be exceeded. For the purpose of carrying out the invention, moreover, it has been found to be advantageous for the fringe parts 31a and 31b to have different pre-forming degrees, for example, when the fringe part 31a (which surrounds the part 30) has a pre-forming degree of 45%, the second fringe part 31b (which surrounds the first fringe part 31a) has a pre-forming degree of 80% of the pre-forming degree of the fringe part 31a. Given a pre-forming degree of the fringe part 31a (or, expressed more generally, of a first partial surface) of between 40% and 85%, it is preferred to arrange for the fringe part 31b (or, expressed more generally, of a second partial surface) to lie in the range between 75% and 100% of this value. If, for instance, a pre-forming degree of 50% is chosen for the first partial surface, that of the second partial surface may amount to between 37.5% and 50%. It will also be advantageous if the annular elements 18 are warmed before they are placed on the mandrel 28 and then moved into the female mould 29 (FIG. 4) in the warmed condition, subsequently adding the head by means of injection moulding or press forming. An advantageous temperature range is the one between 40° C. and 80° C., while the preferred temperatures of the annular elements 18 lie in the range between 45° C. and 60° C.

The invention claimed is:

1. A method of producing a packaging container comprising a tube body having an interior, a tube head arranged on the tube body, the tube head includes a shoulder part and a neck which define an opening, the shoulder part includes a surface which faces the interior of the tube body, and a pre-formed internal annular element arranged on the surface of the shoulder part, the method comprises:
    pre-forming the internal annular element on the surface of the shoulder part, wherein the pre-forming is to a pre-forming degree of between 20% and 95%.

2. A method according to claim 1, including press forming the tube head while simultaneously attaching the tube head to the tube body.

3. A method according to claim 1, including injector molding the tube head while simultaneously attaching the tube head to the tube body.

4. A method according to claim 1, including pre-fabricating the tube head and thereafter attaching the tube head to the tube body.

5. A method according to claim 1,
    wherein the pre-forming is to a pre-forming degree of between 40% and 60%.

* * * * *